United States Patent [19]

Coyle et al.

[11] Patent Number: 4,469,591
[45] Date of Patent: Sep. 4, 1984

[54] FOAM SEPARATOR

[75] Inventors: William E. Coyle, Reedley; Robert E. Gunnerson, Manteca; Richard W. Shoults, Fresno, all of Calif.

[73] Assignee: Sun-Maid Growers of California, Stockton, Calif.

[21] Appl. No.: 419,682

[22] Filed: Nov. 1, 1982

[51] Int. Cl.³ .............................................. B03D 1/14
[52] U.S. Cl. .................................... 209/170; 209/207; 209/288
[58] Field of Search ................. 209/17, 207, 631, 666, 209/686, 687, 690, 164, 170, 198, 241, 270, 288, 428; 210/704, 705, 221.1

[56] References Cited

U.S. PATENT DOCUMENTS 1,480,884  1/1924  Dolbear .............................. 209/170
2,689,650  9/1954  Key ..................................... 209/170
4,169,787  10/1979  Gunnerson .......................... 209/173

FOREIGN PATENT DOCUMENTS 283921  4/1915  Fed. Rep. of Germany ...... 209/207

Primary Examiner—Bernard Nozick
Attorney, Agent, or Firm—Townsend & Townsend

[57] ABSTRACT

A method and system are provided for separating low and high density particles from a mixture thereof. A foam is continuously generated and carried on the outer surface of a horizontal drum. The mixture of particles is deposited on top of the foam surface near the apex of the drum so that the dense particles fall through the foam while the less dense particles are supported on the upper surface of the foam. A first blade is provided to shear the upper surface of the foam and remove the less dense particles. A second blade engages the surface of the drum downstream from the first blade to remove the relatively dense particles. The system finds particular use in separating raisins (dense particles) from waste materials associated with raisins (less dense particles).

15 Claims, 1 Drawing Figure

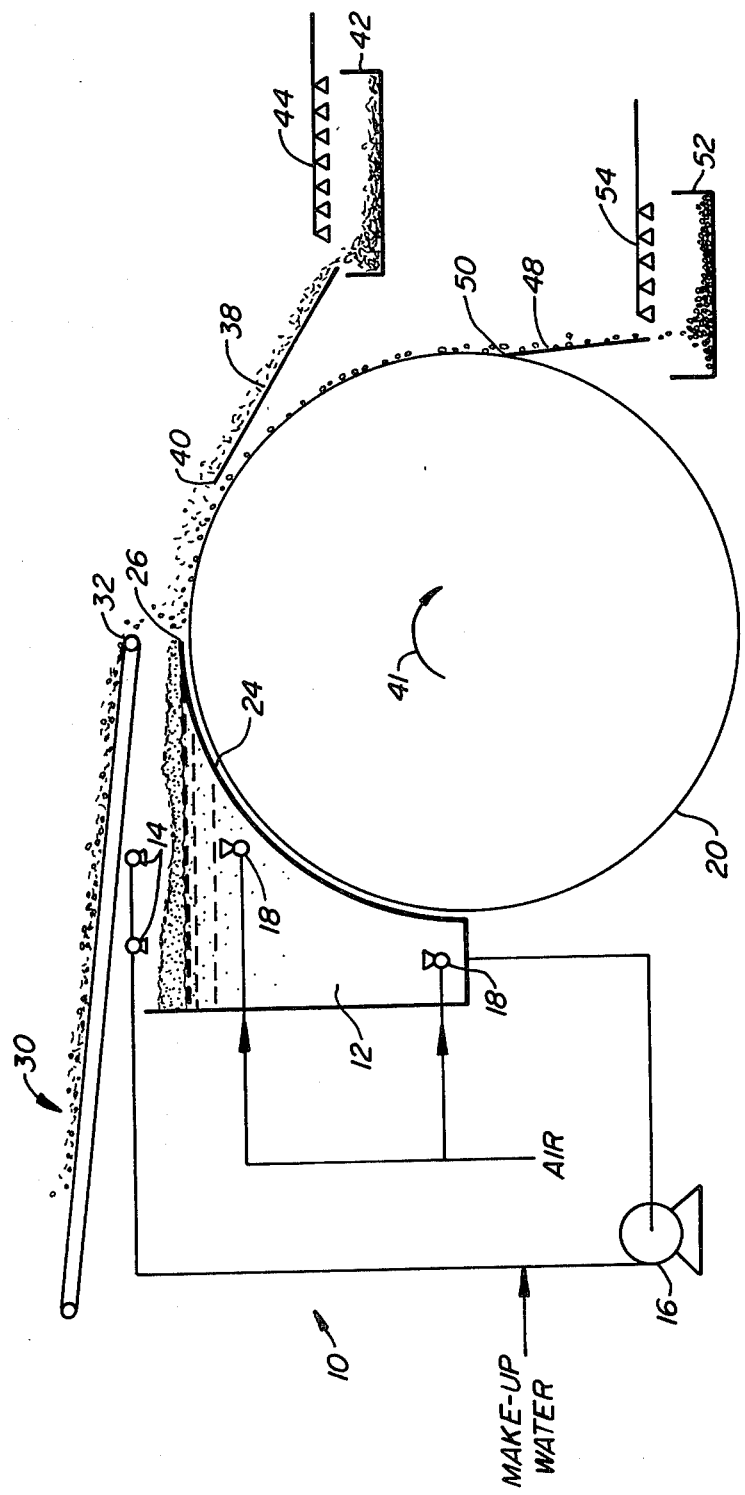
FIG._1.

FOAM SEPARATOR

BACKGROUND OF THE INVENTION

1. Field of the Invention

The present invention relates generally to a device for separating particles based on particle density, and more particularly it relates to a foam separation device where the low density particles are supported on a bed of foam while the high density particles are able to penetrate the bed.

2. Description of the Prior Art

In food processing, it is often desirable to separate the edible and unedible portions of a food product. For example, in processing raisins, it is necessary to separate the fruit from a variety of waste materials including stems, leaves, dried vine, mold-damaged berries and the like. Various mechanical means have been devised to achieve such separation.

One approach employs the principle of film or froth flotation. Such methods rely on differences in the surface characteristics of particles to cause one group of particles to float while the remaining particles sink. Typically, surface active agents will be added to the flotation media to affect the surface wetability of the particles to aid in selecting which particles sink and which float. One such system is the Froth Flotation Cleaner manufactured by a Key Equipment Company/Electro-Sonic Control, Milton-Freewater, Oreg. Such system is described in U.S. Pat. No. 2,689,650. See also: U.S. Pat. No. 2,293,469, which describes a film flotation system employing a rotating drum for separating mineral ores.

A device intended primarily for separating raisins from waste material is described in U.S. Pat. No. 4,169,787 to one of the inventors herein. The system described therein relies on separating the raisins from the waste material using an upward flow of water or solution of adjusted specific gravity.

No method or device proposed heretofore has been entirely successful in separating raisins from associated waste materials. Froth or film flotation devices are not always able to distinguish between the raisins and the debris based on difference in surface properties. Moreover, conventional flotation devices require that the denser material, e.g., raisins, be periodically removed from the liquid separation media which renders it more difficult to perform a continuous separation. The device of U.S. Pat. No. 4,169,787, while achieving separation in a continuous manner, is relatively complex and expensive. It would therefore be desirable to provide a separator capable of accurately separating raisins from associated waste materials, on a continuous basis, which is both simple and relatively inexpensive.

SUMMARY OF THE INVENTION

The present invention is a separator which relies on the ability of a foam to support relatively light and less dense particles, while allowing heavier or denser particles to penetrate the foam. In particular, the apparatus comprises an agitation tank, or other device, for continuously generating a bed of foam, a conveyor for translating the bed of foam along a path, a feeder for discharging the mixture of high and low density particles onto the top of the bed of foam, a diverter for skimming the top layer or foam to remove the less dense particles, and a collector for removing the heavier particles from tthe conveyor. The method of operation relies on generating a relatively dense foam capable of supporting the less dense particles but not the more dense particles.

BRIEF DESCRIPTION OF THE DRAWING

FIG. 1 is a schematic illustration of the apparatus of the present invention.

DESCRIPTION OF THE PREFERRED EMBODIMENT

The apparatus of the present invention comprises five major subsystems. The first subsystem is a foam generator which continuously produces a bed of foam having the necessary characteristics for the present invention. The second subsystem is a foam conveyor which supports the foam and moves the foam along a defined path. The third subsystem is a particle feeder for transferring particles having mixed densities and shapes onto the foam conveyor at the desired location. The fourth subsystem is the low-density particle discharge system which collects a top layer of the foam and diverts the low-density particles to a desired location. Finally, the fifth subsystem is the high-density particle collection system which collects and transports the high-density particles.

The present invention is intended primarily for separating raisins from the waste materials normally associated with raisins, such as stems, dried vines, mold-damaged berries and the like. The invention will also find use, however, with a number of other mixtures where the particles may be separated on the basis of the ability of a foam to support certain of the particles and not support others.

The primary particle characteristic which determines whether or not it will be supported by foam is, of course, density. Particle shape also plays an important role and certain particles will be supported only if they strike the surface of the foam at a particular orientation. For example, long, narrow particles will be supported on the surface (i.e., the plane of impact), if they present a broad face when they strike the foam, but will penetrate the foam if a small end strikes first. After such penetration, such elongate particles will usually be supported in a position normal to the drum surface which allows them to be removed, as described hereinafter. The foam characteristics may be varied in order to handle a variety of different substances, as will be discussed in more detail hereinafter.

Referring now to FIG. 1, the preferred apparatus of the present invention will be described. A foam generator 10 comprises a reservoir 12 and foam generating nozzles 14. A pump 16 recirculates a liquid, to be described in more detail hereinafter, from the reservoir 12 through the nozzles 14 to generate a bed of foam on the liquid surface in the reservoir. Additionally, air nozzles 18 may be provided to further agitate the liquid in the reservoir to enhance the foam production.

The system for supporting and transporting the foam is conveniently a cylindrical drum 20 having a perforated cylindrical wall. The perforations allow free water in the foam to drain and help retain the foam in place on the outer surface of the drum. Usually, a mechanism (not shown) for collecting the drained water and for returning the water to the reservoir 12 will be provided in order to conserve both the liquid and surfactants which have been added to the water to allow foam formation.

The dimensions of the drum 20 are not critical and will be based primarily on the product throughput. Usurlly, the drum will have a diameter of at least about three feet to provide a sufficiently long path to allow placement of the remaining systems therealong. The axial length of the drum 10 can be extended virtually indefinitely to increase the system throughout, limited only by the necessity of mechanically supporting the drum. A motor (not shown) will be provided for rotating the drum at an RPM in the range of from about 4 to 12.

Although a drum has been illustrated and described in connection with the preferred embodiment, other means could be provided for translating the foam. For example, a screen conveyor could be located proximate the foam generator 10 and act to carry the foam along a path. It is convenient that the path be generally downward so that blades may be used to divert the flow of the foam by gravity. Such a downward path is not, however, necessary since the top layer of foam could be removed by a vacuum or a second conveyor designed to raise the layer.

Conveniently, the reservoir 12 will have an arcuate wall 24 which is complementary to the outer surface of the drum 20. The wall 24 will terminate at a lip 26 adjacent the uppermost (as viewed in FIG. 1) point of the drum 20. In this way, the wall 24 defines a weir which allows the foam generated in the reservoir 12 to flow outward from the reservoir 12 and on to the exterior or outer surface of the drum 20. The remaining walls of the reservoir 12 are higher than the lip 26 to prevent the foam from being lost from the reservoir 12.

The feed system for the foam separator will typically be one or more conveyors 30 of conventional design. The discharge end 32 of the conveyor 30 is substantially aligned with the lip 26 of reservoir 12, but extends slightly to the right as viewed in FIG. 1. The discharge point 32 is spaced upward from exterior surface of the drum 20 a sufficient distance to allow the foam generated in generator 10 to flow onto the drum and be carried thereby. The precise spacing depends on the expected depth of the foam bed and will usually be in the range from about 2 to 6 inches. It is desirable that the vertical drop from the output 32 to the upper surface of the foam be minimized so that the lighter particles do not gain sufficient velocity to fall through the foam. Usually, the output end 32 of the conveyor 30 will slightly touch the upper surface of the foam to assure that the drop will not be excessive.

The foam diverter subsystem comprises a blade 38 having a leading edge 40 proximate to, but spaced apart a preselected distance from, the outer surface of the drum 20. The leading edge 40 of the blade 38 will be "downstream" from the output 32 of the feed conveyor 30. "Downstream" meant that the foam passes the by the output 32 before reaching the leading edge 40. This results from the clockwise rotation of the drum 20, as indicated by arrow 41.

The blade 38 has a width approximately equal to the axial length of the drum 40 so that, as the drum is rotated, the upper layer of the foam is sheared and removed. The blade 38 defines a generally downward path so that the foam will flow smoothly to a discharge conveyor 42. The position of the leading edge 40 relative to the drum 20 is adjustable to allow operation with different thicknesses of foam and different sized particles.

A plurality of heated-air nozzles 44 will usually be provided to eliminate the foam from the low density particles as they are carried away on the conveyor 42.

Further downstream from the blade 38, a second blade 48 scrapes the remaining foam and high density particles from the surface of the rotating drum 20. Preferably, the blade is oriented vertically with its leading edge 50 engaging the drum at approximately "3 o'clock" as illustrated in FIG. 1. The high density particles and foam are then able to travel vertically downward into a second discharge conveyor 52 which carries them away for further processing. As was the case with the first discharge conveyor 42, a plurality of air nozzles 54 are usually provided for eliminating the foam.

Both conveyors 42 and 52 are usually provided with mesh bottoms so that, as the foam is destroyed, it can be collected and recycled to the reservoir 12. The means for collecting the resulting liquid and recycling it to the reservoir 12 are conventional and are not illustrated.

The foam employed will depend in large part on the nature of the particles being separated. Usually, the foam will be relatively viscous, having a Brookfield viscosity (measured on a Brookfield viscometer type LVF with a No. 2 spindle at 30 rpm) above about 500, more usually about 750. The density of the foam will usually be in the range from about 10 to 20 g/L, more usually about 15 g/L, corresponding to a bubble diameter of about 0.5 to 2.0 mm. Such a foam is a rich, creamy foam capable of supporting particles having a specific gravity below about 1.18.

In the exemplary processing of raisins, the foam should be made from food-grade materials since it is possible that not all residual foam will be removed prior to packaging. The foam will usually be an aqueous foam resulting from the agitation of water having surfactants or surface active agents added thereto. Usually an emulsifier/stabilizer, such as a food grade detergent, will be combined with an edible foaming material, such as a protein or polysaccharide. A suitable detergent is sorbitan monostearate, available under the tradename "TWEEN 60" from the Atlas Chemical Division of ICI America, Inc., Wilmington, Del. Suitable protein materials include egg albumin and Gunther's G400V, available from the Staley Company, Galesburg, Ill. A suitable polysaccharide is propylene glycol alginate available from the Kelco Division of Merck & Company, San Diego, Calif.

The aqueous solution will usually contain from about 1 to 5% of each of the emulsifier and the foaming material. The concentration can be varied somewhat, depending on the particular nature of the foam desired. In the case of raisins, the preferred concentrations are 1.0% emulsifier and 1.0% foaming material which creates a foam having a Brookfield Viscosity of 790 centipoises when strongly agitated.

In operation, the reservoir 12 is initially charged with the aqueous media as just described. The recirculation pump 16 is then started and air injected through nozzles 18. As the foam is created, it flows over the weir 26 and onto the slowly rotating drum 20. The foam, of course, is primarily composed of water, some of which drains from the foam as it is transported by the drum 20. The perforations on the drum, which are usually a fine mesh screen, typically 100 mesh, allows the water which drains from the foam to pass through the drum 20 and collect to be recycled back to the reservoir 12. Additionally, any free water which passes over the weir 26 will also pass through the drum and be recycled.

The raisins, or other product such as shelled walnut pieces, are dropped gently from the discharge end 32 of the conveyor 30 onto the upper surface of the foam. The raisins, being relatively dense and having a generally spherical shape, fall through the foam to the wire mesh surface of the drum where they are retained as the drum rotates. The stems and twigs usually have less mass in relation to their largest dimension so that they are able to "float" on the surface of the foam. In some instances, however, the stems or other debris will impinge the foam perpendicularly to the surface so that they are able to penetrate the foam. Usually, the stems will penetrate into the wire mesh and be supported by the foam in an upright fashion.

As the drum 20 rotates, the leading edge 40 of blade 38 is encountered. The upper surface of the foam bed is sheared, removing the majority of the debris which floats thereon. The raisins, however, lying adjacent the wire mesh surface of the drum 20 are able to pass underneath the leading edge 40 and travel further on the drum. The distance between the leading edge 40 and the surface of the drum 20 is chosen, however, to lie just above the maximum expected dimension of the raisins. In this way, even the stems which lie perpendicularly to the drum surface and which project substantially above the raisins, are engaged by the blade 38 and carried away thereby.

The foam remaining on the drum continues to rotate until it reaches the second blade 48. There, substantially all remaining foam and the remaining raisins are removed from the drum and transported away by conveyor 52 for subsequent processing.

Although the present invention has been described in detail by way of illustration and example for purposes of clarity of understanding, it will be obvious that certain changes and modifications may be practiced within the scope of the appended claims.

What is claimed is:

1. A separator for separating high density and low density particles from a mixture thereof, said separator comprising:
   means for continuously generating a bed of foam;
   means for conveying the bed of foam along a path;
   means for feeding the mixture onto the foam at a first point along the path, whereby the low density particles are supported by the foam and the high density particles fall through the foam to the conveying means;
   means for diverting a top layer of the foam from the conveying means located at a second point along the path downstream from the first point, whereby the low density particles are removed; and
   means located at a third point along the path downstream from the diverting means for collecting the high density particles from the surface of the conveying means.

2. A separator as in claim 1, wherein the means for generating a bed of foam is a liquid tank having a plurality of gas nozzles therein, whereby foam may be generated by adding liquid and a surface active agent to the tank and agitating the liquid with air.

3. A separator as in claim 1, wherein the means for generating a bed of foam is a liquid tank and means for circulating the liquid to provide foam generation.

4. A separator as in claim 1, further comprising a means for conveying the low density particles away from the means for diverting.

5. A separator as in claim 1, further comprising a means for conveying the high density particles away from the means for collecting.

6. A separator as in claim 1, wherein the means for conveying the foam comprises a perforated drum and means for rotating the drum about a substantially horizontal axis.

7. A separator as in claim 6, wherein the means for feeding the mixture comprises a conveyor belt which discharges the mixture at substantially the highest point on the drum.

8. A separator as in claim 7, wherein the means for collecting comprises a scraping blade which engages the surface of the drum and defines a divergent path away from the surface of the drum.

9. A separator as in claim 7, wherein the means for diverting comprises a blade having a leading edge spaced apart from the surface of the drum and defining a divergent path away from the surface of the drum.

10. A separator as in claim 9, wherein the distance between the leading edge of the blade and the surface of the drum is adjustable.

11. A separator for separating high density and low density particles from a mixture thereof, said separator comprising:
   a frame;
   a perforated, cylindrical drum rotatably mounted on the frame with a horizontal axis of rotation;
   a reservoir mounted on the frame and having a weir adjacent the surface of the drum;
   means for rotating the drum;
   means for generating foam in the reservoir so that a bed of foam is transferred to the drum as it is rotated;
   a conveyor for feeding the mixture to the drum at a location downstream of the weir;
   a diverting blade downstream of the conveyor and having a leading edge spaced apart from the surface of the drum, said blade having an upper surface which diverges from the surface of the drum to define a first discharge path; and
   a scraping blade downstream from the diverting blade and having a leading edge which engages the surface of the drum to remove the high density particles therefrom.

12. A separator as in claim 11, wherein the weir in the reservoir is defined by an arcuate wall which is located adjacent the cylindrical drum.

13. A separator as in claim 11, wherein the means for generating foam comprises a plurality of spray nozzles and a pump system for recirculating liquid from the reservoir to the spray nozzles, whereby recirculation of the liquid causes foaming.

14. A separator as in claim 11, further comprising a conveyor for transporting the low density particles from the diverting blade and means for spraying the low density particles with heated-air to eliminate the foam.

15. A separator as in claim 11, further comprising a conveyor for transporting the high density particles from the scraping blade and means for spraying the high density particles with heated-air to eliminate the foam.

* * * * *